United States Patent

Wada

(10) Patent No.: US 12,050,818 B2
(45) Date of Patent: Jul. 30, 2024

(54) IMAGE PROCESSING APPARATUS, IMAGE PROCESSING METHOD, AND STORAGE MEDIUM FOR INSPECTING A PRINTED IMAGE

(71) Applicant: CANON KABUSHIKI KAISHA, Tokyo (JP)

(72) Inventor: Asuka Wada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/303,492

(22) Filed: Apr. 19, 2023

(65) Prior Publication Data

US 2023/0350612 A1 Nov. 2, 2023

(30) Foreign Application Priority Data

Apr. 27, 2022 (JP) ................................. 2022-073897

(51) Int. Cl.
*G06F 3/12* (2006.01)
(52) U.S. Cl.
CPC .......... *G06F 3/1208* (2013.01); *G06F 3/1253* (2013.01); *G06F 3/1293* (2013.01)
(58) Field of Classification Search
None
See application file for complete search history.

(56) References Cited

U.S. PATENT DOCUMENTS

| | | | | |
|---|---|---|---|---|
| 2013/0222823 | A1* | 8/2013 | Hyoki | H04N 1/6066 |
| | | | | 358/1.9 |
| 2014/0093139 | A1* | 4/2014 | Yamagishi | H04N 1/00005 |
| | | | | 382/112 |
| 2015/0003845 | A1* | 1/2015 | Morishita | G03G 15/55 |
| | | | | 399/15 |
| 2019/0139220 | A1* | 5/2019 | Akiyama | H04N 1/0408 |
| 2020/0090317 | A1* | 3/2020 | Sugimoto | G06K 15/1868 |
| 2023/0121550 | A1* | 4/2023 | Komazawa | G06F 3/1243 |
| | | | | 358/1.13 |

FOREIGN PATENT DOCUMENTS

JP 2019084743 A 6/2019

* cited by examiner

*Primary Examiner* — Dung D Tran
(74) *Attorney, Agent, or Firm* — Canon U.S.A., Inc. IP Division

(57) ABSTRACT

An image processing apparatus includes a setting unit configured to set an inspection resolution for inspecting a printed image for each page, and an inspection unit configured to inspect the printed image by comparing reference image data serving as a reference for inspection with printed image data acquired by reading the printed image based on the set inspection resolution.

10 Claims, 13 Drawing Sheets

FIG.6

| HIGH-FREQUENCY COMPONENT AMOUNT | INSPECTION RESOLUTION (dpi) |
|---|---|
| LARGE | 300 |
| MEDIUM | 200 |
| SMALL | 150 |

FIG.7

| PAGE NUMBER | INSPECTION RESOLUTION (dpi) |
|---|---|
| 1 | 150 |
| 2 | 200 |
| 3 | 200 |
| 4 | 150 |
| 5 | 150 |
| 6 | 300 |

FIG.10

| NUMBER OF FEATURE POINTS | INSPECTION RESOLUTION (dpi) |
|---|---|
| 20 OR MORE | 300 |
| 3 OR MORE AND LESS THAN 20 | 200 |
| LESS THAN 3 | 150 |

FIG.12

| PERCENTAGE OF EDGE AREA (%) | INSPECTION RESOLUTION (DPI) |
|---|---|
| 40 OR MORE | 300 |
| 15 OR MORE AND LESS THAN 40 | 200 |
| LESS THAN 15 | 150 |

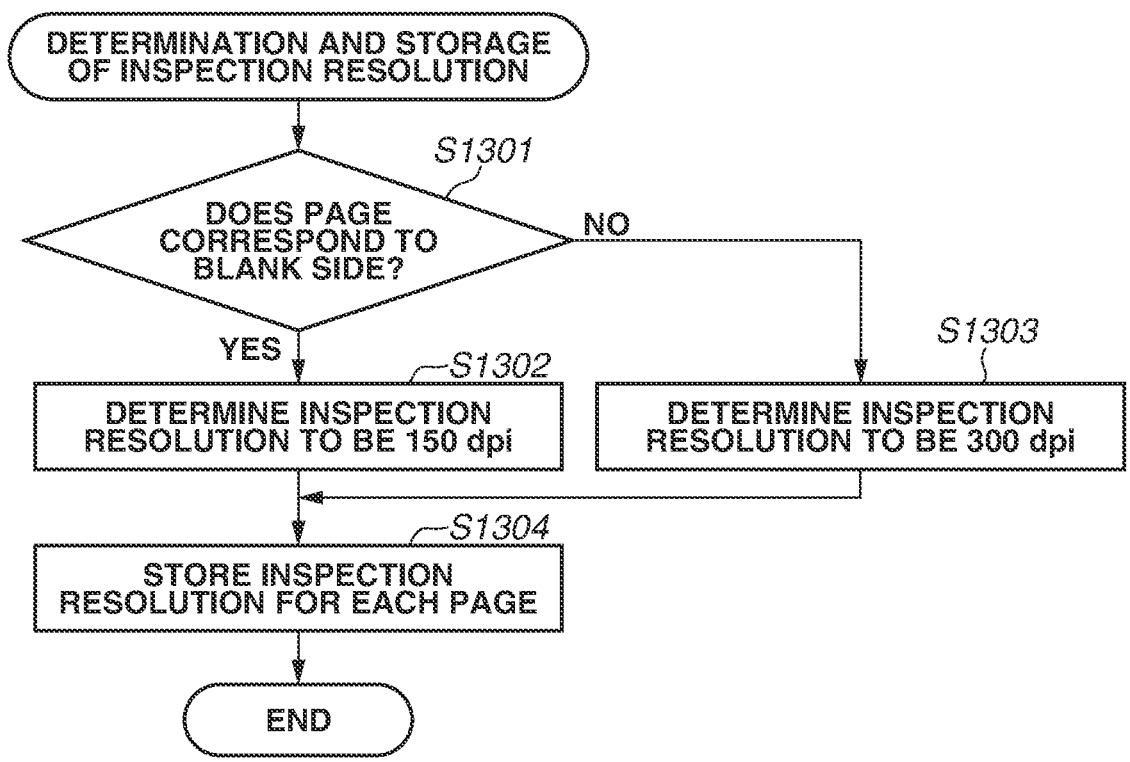

IMAGE PROCESSING APPARATUS, IMAGE PROCESSING METHOD, AND STORAGE MEDIUM FOR INSPECTING A PRINTED IMAGE

BACKGROUND

Field of the Disclosure

The present disclosure relates to a technique for inspecting a printed material.

Description of the Related Art

Inspection work is performed after a material is printed out in order to ensure that the printed material has no defect and no problem with quality. For example, image data of a non-defective printed material (hereinbelow, referred to as a reference image) is generated in advance. Next, image data of the printed material that is an inspection target (hereinbelow, referred to as a printed image) is acquired by scanning, image-capturing, or the like. Then, inspection is performed by comparison of these two pieces of image data. If there is a large difference between the two pieces of image data that exceeds a predetermined acceptable range, the difference is determined to be a defect. In a case where a printed material includes a plurality of pages, a reference image is generated for each of the pages in advance, and the inspection can be similarly performed by comparison thereof with the printed image.

According to Japanese Patent Application Laid-Open No. 2019-84743, a method is discussed for reducing a storage capacity for storing images in which a reference image and a printed image are each generated with an inspection resolution corresponding to an inspection level set by a user.

It is desirable that a reference image and a printed image are comparable image data, i.e., have the same resolution (hereinbelow, referred to as inspection resolution). The inspection resolution affects a detectable defect size (hereinbelow, referred to as inspection accuracy) and a processing time required for an inspection (hereinbelow, referred to as an inspection time). More specifically, there is a relationship that if the inspection resolution is high, the inspection accuracy is high and the inspection time is long, and if the inspection resolution is low, the inspection accuracy is low and the inspection time is short.

However, in the method discussed in Japanese Patent Application Laid-Open No. 2019-84743, the same inspection resolution is set for all pages. Thus, the inspection resolution is set based on a page that requires the highest inspection accuracy in a series of printed materials, and as a result, the inspection time may be long in some cases.

SUMMARY

Embodiments of the present disclosure are directed to reducing an inspection time while inspection is performed with a required inspection accuracy by making it possible to set a different inspection resolution for each page.

According to embodiments of the present disclosure, an image processing apparatus includes a setting unit configured to set an inspection resolution for inspecting a printed image for each page, and an inspection unit configured to inspect the printed image by comparing reference image data serving as a reference for inspection with printed image data acquired by reading the printed image based on the set inspection resolution.

Further features of the present disclosure will become apparent from the following description of exemplary embodiments with reference to the attached drawings.

BRIEF DESCRIPTION OF THE DRAWINGS

FIG. 6 illustrates an example of a method for storing frequency component information and the inspection resolution according to the first exemplary embodiment.

FIG. 7 illustrates an example of a method for storing a page and the inspection resolution according to the first exemplary embodiment.

FIG. 10 illustrates an example of a method for storing feature amount information and the inspection resolution according to the second exemplary embodiment.

FIG. 12 illustrates an example of a method for storing edge area information and the inspection resolution according to the third exemplary embodiment.

FIG. 13 is a flowchart illustrating processing for determining an inspection resolution according to a fourth exemplary embodiment.

DESCRIPTION OF THE EMBODIMENTS

Exemplary embodiments of the present disclosure will be described below with reference to the attached drawings. The exemplary embodiments described below do not necessarily limit the present disclosure. Further, not all combinations of features described in the present exemplary embodiments are essential for solving means of the present disclosure.

In a first exemplary embodiment, an inspection resolution for each page is determined by use of frequency component information for each page. Accordingly, an inspection time is reduced while an inspection is performed with a required inspection accuracy.

<Configuration of Print System>

Figure 1:
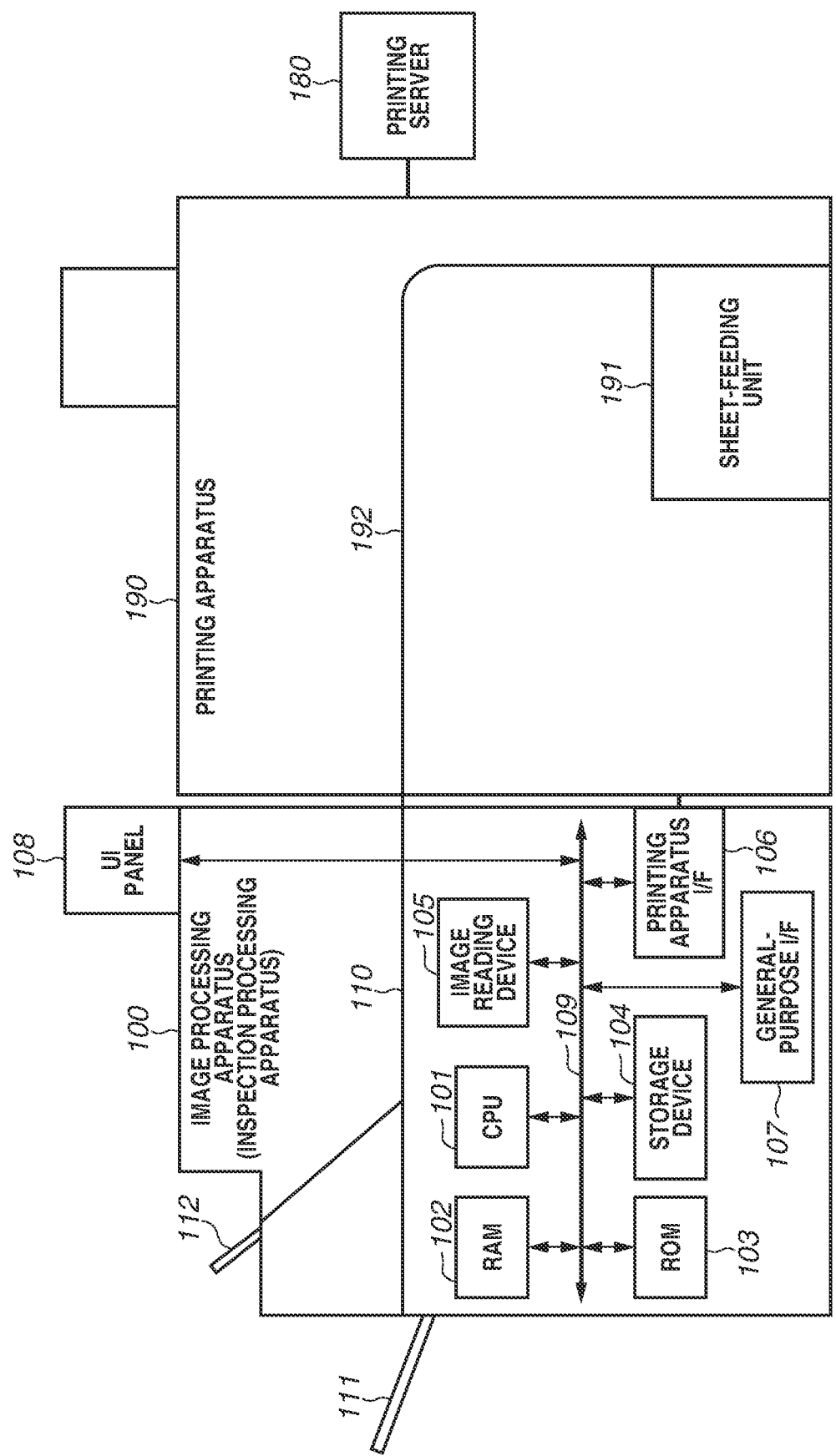
FIG. 1 illustrates an overall configuration of a print system including an image processing apparatus.

FIG. 1 illustrates a configuration example of a print system that includes an image processing apparatus 100 according to the present exemplary embodiment and outputs and inspects a printed material. The print system according to the present exemplary embodiment includes the image processing apparatus 100, a printing server 180, and a printing apparatus 190. The printing server 180 generates a print job of a document to be printed and inputs the print job to the printing apparatus 190. The printing apparatus 190 forms an image on a recording medium (for example, paper)

based on the print job input from the printing server 180. The printing apparatus 190 includes a sheet-feeding unit 191, and a user sets a print sheet in the sheet-feeding unit 191 in advance. Once the print job is input, the printing apparatus 190 forms an image on a front side or both sides of the print sheet set in the sheet-feeding unit 191 while conveying the print sheet along a conveyance path 192, and transmits the print sheet to the image processing apparatus 100.

The image processing apparatus 100 according to the present exemplary embodiment performs inspection processing to check whether there is a printing failure or a defect on a printed material on which an image has been formed by the printing apparatus 190 and that has been transmitted via the conveyance path 192. In other words, the image processing apparatus 100 functions as an inspection processing apparatus. The image processing apparatus 100 includes a central processing unit (CPU) 101, a random access memory (RAM) 102, a read-only memory (ROM) 103, a storage device 104, and an image reading device 105. The image processing apparatus 100 also includes a printing apparatus interface (I/F) 106, a general-purpose I/F 107, a user interface (UI) panel 108, and a main bus 109. The image processing apparatus 100 further includes a conveyance path 110 for a printed material connected to the conveyance path 192 of the printing apparatus 190, an output tray 111 for the printed material that has passed the inspection, and an output tray 112 for the printed material that has failed the inspection.

The CPU 101 is a processor that comprehensively controls each unit in the image processing apparatus 100.

The RAM 102 functions as a main memory, a work area, and the like of the CPU 101. The ROM 103 stores a group of programs to be executed by the CPU 101. The storage device 104 stores an application to be executed by the CPU 101, data to be used for image processing, and the like.

The image reading device (scanner) 105 can read one side or both sides of the printed material transmitted from the printing apparatus 190 on the conveyance path 110 and acquire read data as image data. In the present exemplary embodiment, the image reading device 105 is a line scanner. The printing apparatus I/F 106 is connected to the printing apparatus 190, so that the image processing apparatus 100 can synchronize processing timing of the printed material with the printing apparatus 190 and both of the apparatuses can exchange an operating status with each other. The general-purpose I/F 107 is a serial bus interface such as a Universal Serial Bus (USB) and one of the Institute of Electrical and Electronics Engineers (IEEE) 1394, and a user can take out data such as a log therethrough.

The UI panel 108 is a liquid crystal display on which a user interface is displayed, and displays a current status and a setting to inform a user thereof. The UI panel 108 receives a print setting such as a size and a type of a sheet from the user, for example, via a mouse and a keyboard (not illustrated) connected to the general-purpose I/F 107. The main bus 109 connects each of the units in the image processing apparatus 100. In addition, although not illustrated in FIG. 1, each unit inside the image processing apparatus 100 and the print system can be operated according to an instruction from the CPU 101. For example, it is possible to synchronously move the conveyance paths and to switch the output tray to which the printed material is transmitted between the output tray 111 for an accepted printed material and the output tray 112 for a rejected printed material depending on an inspection result.

Only printed materials whose quality is confirmed in this way are collected in the output tray 111 as deliverables.

<Configuration of Image Processing Apparatus>

Figure 2:
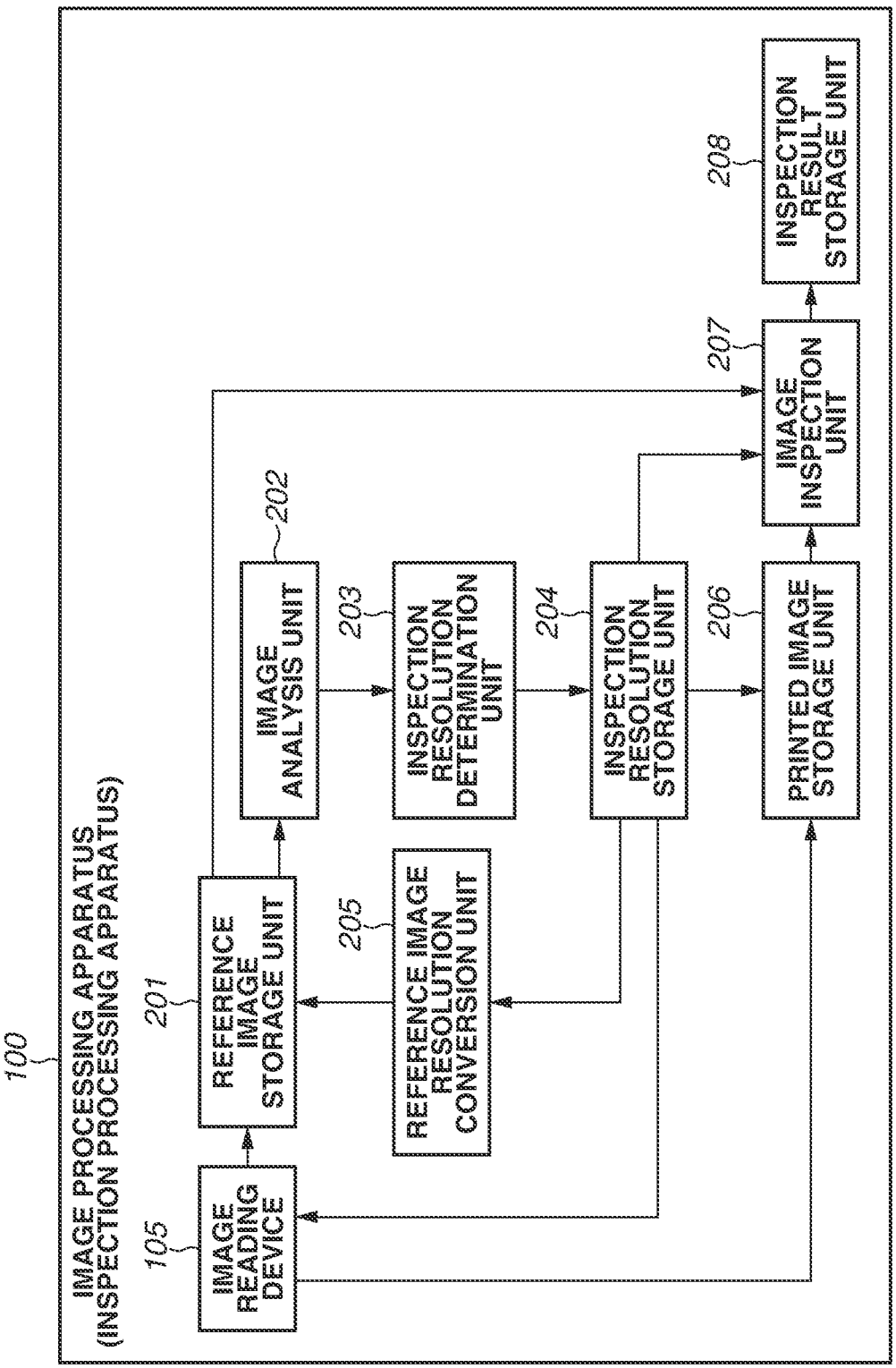
FIG. 2 is a block diagram illustrating a configuration example of an image processing apparatus according to a first exemplary embodiment.

FIG. 2 is a block diagram illustrating a configuration of the image processing apparatus 100 according to the present exemplary embodiment of the present disclosure. The image processing apparatus 100 includes the image reading device 105, but an external apparatus may be used instead as long as it can transmit read image data to the image processing apparatus 100. The image processing apparatus 100 also includes a reference image storage unit 201, an image analysis unit 202, an inspection resolution determination unit 203, an inspection resolution storage unit 204, and a reference image resolution conversion unit 205 (hereinbelow, also referred to as the conversion unit 205). The image processing apparatus 100 further includes a printed image storage unit 206, an image inspection unit 207, and an inspection result storage unit 208.

The image reading device 105 reads the printed material printed by the printing apparatus 190 and converts a read image into electronic image data using an image reading mechanism such as a line scanner. The reference image storage unit 201 selects image data that serves as a reference for inspection as a reference image from among printed image data read by the image reading device 105 and stores the image data. The image analysis unit 202 analyzes the reference image stored in the reference image storage unit 201.

The inspection resolution determination unit 203 determines an inspection resolution for each page based on analysis information analyzed by the image analysis unit 202. The inspection resolution storage unit 204 stores the inspection resolution for each page determined by the inspection resolution determination unit 203. The conversion unit 205 converts the reference image stored in the reference image storage unit 201 based on the inspection resolution for each page stored in the inspection resolution storage unit 204. The printed image storage unit 206 stores the printed image data acquired based on the inspection resolution for each page stored in the inspection resolution storage unit 204 as the printed image that is an inspection target.

The image inspection unit 207 inspects the printed material by comparing the reference image stored in the reference image storage unit 201 with the printed image stored in the printed image storage unit 206. The inspection result storage unit 208 stores an inspection result by the image inspection unit 207.

<Processing by Image Processing Apparatus>

Figure 3:
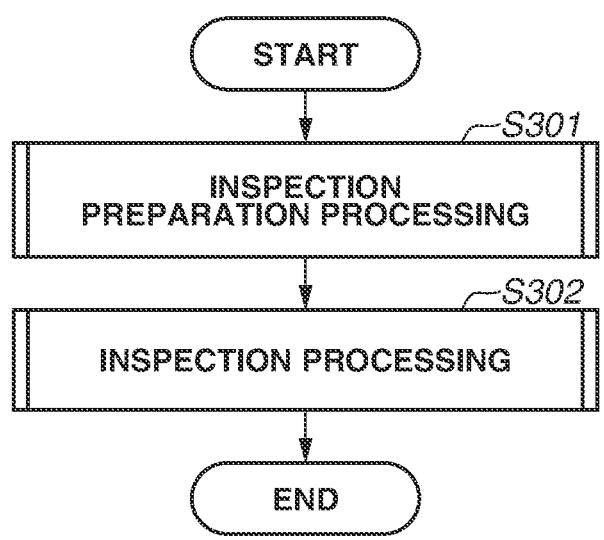
FIG. 3 is a flowchart illustrating overall processing according to the first exemplary embodiment.

FIG. 3 is a flowchart illustrating processing to be executed by the image processing apparatus 100 according to the present exemplary embodiment. Hereinbelow, each step of the processing is indicated by a step number with a prefix "S".

In step S301, preparation processing for inspection is performed. Step S301 is executed for the purpose of preparing the reference image, which serves as a reference for inspection, and as pre-processing for the inspection processing. Thus, step S301 may be executed during a period from when the image reading device 105 reads the image data serving as the reference for inspection to when the printing apparatus 190 starts print processing, and has few restrictions on a processing time.

The processing in step S301 is described in detail below with reference to FIGS. 3 to 7.

In step S302, the inspection processing is performed. Step S302 is often executed simultaneously with print processing by the printing apparatus 190. Particularly, in a case where a processing time for executing step S302, i.e., the inspection time is longer than a time for executing print processing, a throughput of the entire system depends on the inspection time, and thus reduction of the inspection time is required. The processing in step S302 is described in detail below with reference to FIG. 8.

<Inspection Preparation Processing>

Figure 4:
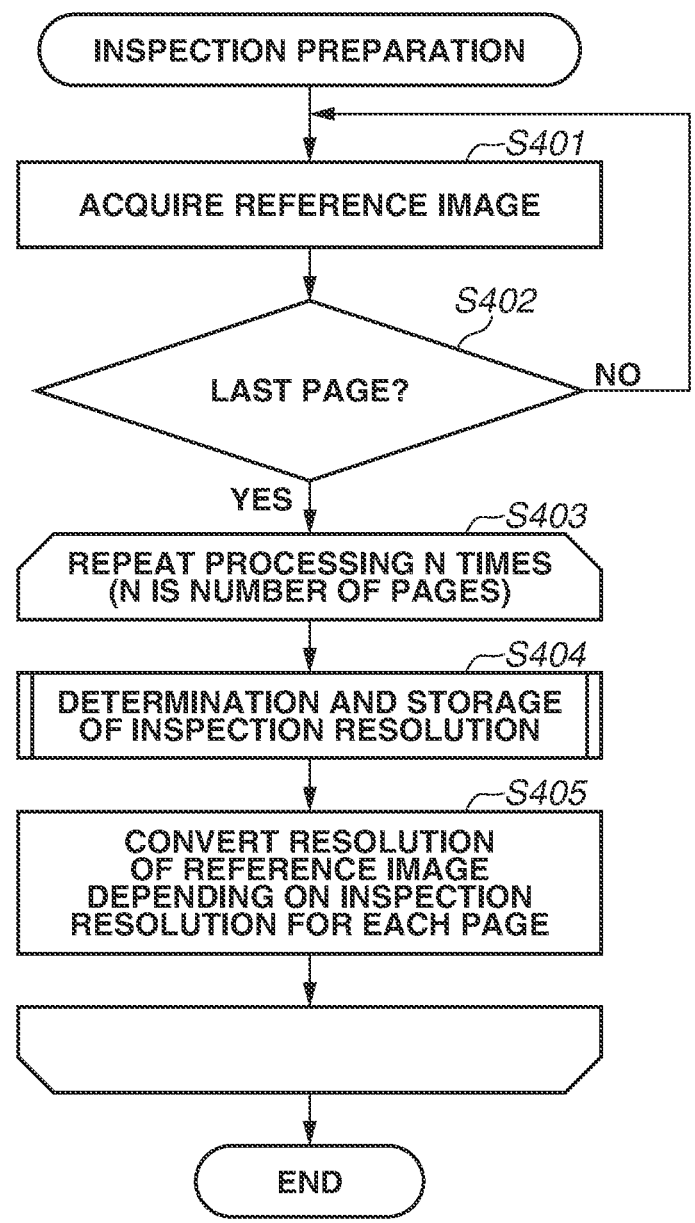
FIG. 4 is a flowchart illustrating inspection preparation processing according to the first exemplary embodiment.

FIG. 4 is a flowchart illustrating inspection preparation processing according to the first exemplary embodiment and corresponding to the processing in step S301 in FIG. 3.

In step S401, the reference image storage unit 201 acquires the reference image. The reference image acquired here is generated by the image reading device 105 such as a line scanner reading each page of the printed material printed by the printing apparatus 190. The resolution of the reference image to be stored in the reference image storage unit 201 is determined by a mechanism and a setting of the image reading device 105. Depending on the mechanism of the image reading device 105, the resolution of the reference image may differ in a main scanning direction and in a sub-scanning direction. In the present exemplary embodiment, the description continues as follows on an assumption that the resolution of the reference image for each page stored in the reference image storage unit 201 in step S401 is 600 dots per inch (dpi) in both the main scanning direction and the sub-scanning direction.

In step S402, it is determined whether the reference image stored in the reference image storage unit 201 is the last page of the printed material that is the inspection target. In a case where it is determined that the reference image is the last page (YES in step S402), the processing proceeds to step S403. In a case where it is determined that the reference image is not the last page, i.e., there is a subsequent page (NO in step S402), the processing returns to step S401 to repeat the processing. Whether it is the last page may be determined, for example, based on a fact that the image data is not acquired from the image reading device 105 for a certain period of time. In addition, a total number of pages of the printed material that is the inspection target may be acquired from the printing apparatus 190 in advance, and the determination may be made by comparison of the total number of pages with the number of the reference images already stored in the reference image storage unit 201. In any case, a procedure or an aspect for determining the last page is not limited in the present exemplary embodiment. In the present exemplary embodiment, an example is described in which the image data acquired by the image reading device 105 is stored in the reference image storage unit 201 as needed, but the reference image may be stored in the reference image storage unit 201 in one aspect. For example, a plurality of image data may be acquired for a specific page, and image data suitable for the reference for inspection may be selected from among the plurality of image data and stored as the reference image, or the reference image may be generated from a combination of the plurality of image data and stored.

In step S403, the processing in subsequent steps S404 and S405 is repeated N times where N is the number of reference images existing in the reference image storage unit 201. The number of repetitions N corresponds to the number of pages of the printed material that is the inspection target.

In step S404, the inspection resolution determination unit 203 determines the inspection resolution for each page, and the determined inspection resolution is stored in the inspection resolution storage unit 204. The processing in step S404 is described in detail below with reference to FIG. 5.

In step S405, the conversion unit 205 converts the inspection resolution of the reference image stored in the reference image storage unit 201. The reference image after the conversion is stored again in the reference image storage unit 201. The inspection resolution before the conversion is 600 dpi, which is the resolution of the reference image stored in the reference image storage unit 201 in step S401, and the inspection resolution after the conversion is the inspection resolution for each page stored in the inspection resolution storage unit 204 in step S404. The resolution of the reference image after the conversion is equal to or lower than that of the reference image before the conversion.

By the above-described processing, the reference image for each page is stored in the reference image storage unit 201, and the inspection preparation is completed.

<Processing for Determining Inspection Resolution>

Figure 5:
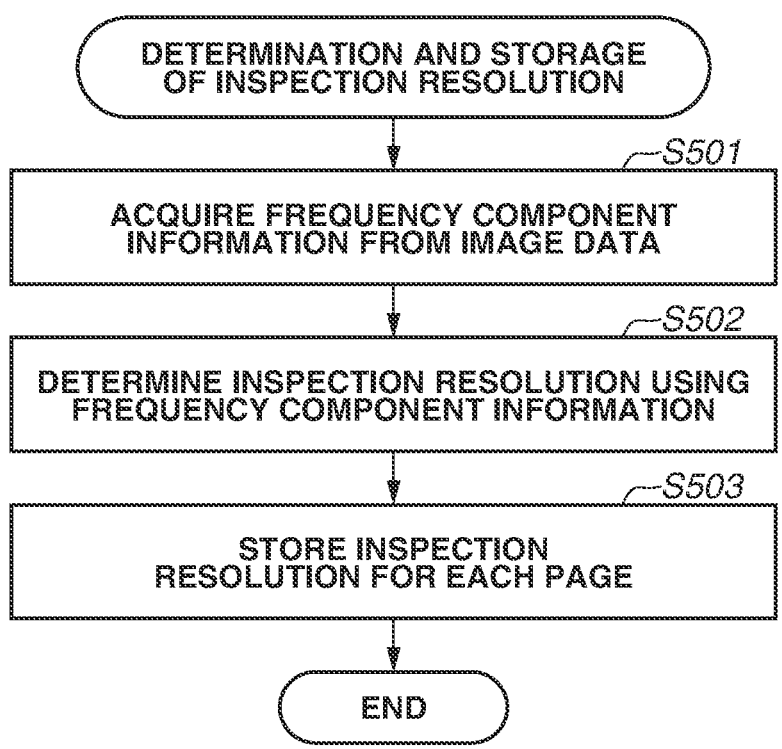
FIG. 5 is a flowchart illustrating processing for determining an inspection resolution according to the first exemplary embodiment.

FIG. 5 is a flowchart illustrating processing for determining and storing the inspection resolution according to the first exemplary embodiment and corresponding to the processing in step S404 in FIG. 4.

In step S501, the image analysis unit 202 acquires frequency component information from the reference image.

The frequency component information corresponds to, for example, distribution information of frequency components in a page acquired by performing Fourier transform on the reference image.

In step S502, the inspection resolution determination unit 203 determines the inspection resolution for each page using the frequency component information acquired in step S501. As a specific example, the inspection resolution determination unit 203 determines whether a high-frequency component amount in the corresponding page is large or small from the frequency component information and assigns the inspection resolution. The inspection resolution may be set not for all pages, but for at least only some pages.

In step S503, the inspection resolution storage unit 204 stores the inspection resolution for each page determined in step S502.

<Method for Storing Frequency Component Information and Inspection Resolution>

Figure 6:
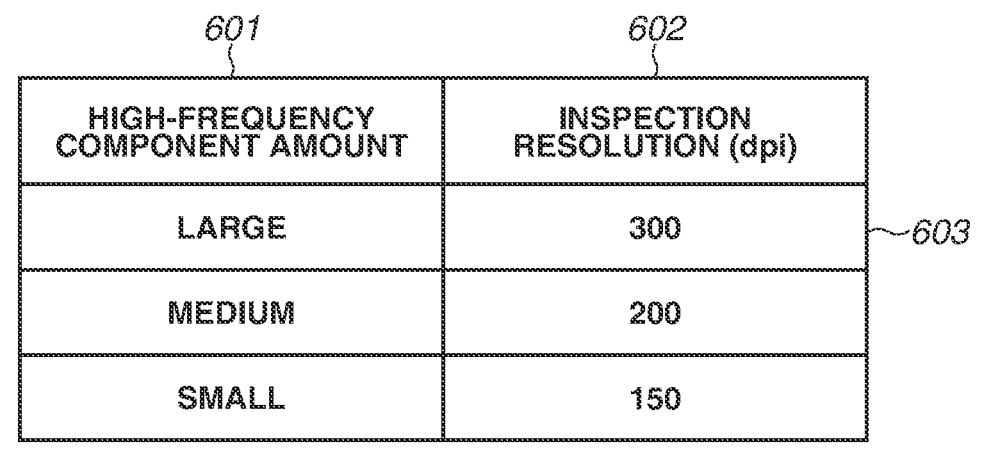

FIG. 6 illustrates an example of a method for storing a relationship between the frequency component information and the inspection resolution according to the present exemplary embodiment.

In FIG. 6, a threshold value for the high-frequency component amount is set in a column 601. A column 602 indicates the inspection resolution assigned to each high-frequency component amount indicated in the column 601. The inspection resolution described in the column 602 is set to a resolution equal to or lower than 600 dpi, which is the resolution of the reference image stored in the reference image storage unit 201 in step S401. In an example in a row 603, the inspection resolution of 300 dpi is assigned to the reference image determined as including a "large" amount of high-frequency components.

In the example in FIG. 6, a relatively high inspection resolution is assigned to the reference image determined as including the "large" amount of high-frequency components, and a relatively low inspection resolution is assigned to a reference image determined as including a "small" amount of high-frequency components. However, the relatively high inspection resolution may be assigned to the reference image determined as including the "small" amount of high-frequency components, and the relatively low inspection resolution may be assigned to the reference image determined as including the "large" amount of high-frequency components. For example, in a case where a printed material that includes a pattern including a character and a bar code is the inspection target, the relatively high inspection resolution is assigned to the reference image determined as including the large amount of high-frequency components, and thus it is possible to improve the inspection accuracy of a page including a character and a bar code. On the other hand, in a case where a printed material that includes many natural images is the inspection target, the relatively high inspection resolution is assigned to the reference image determined as including the small amount of high-frequency components, and thus it is possible to improve the inspection accuracy of a page printed with a low-frequency image in which a defect is generally more noticeable.

The threshold value for the high-frequency component amount indicated in the column 601 and the inspection resolution to be assigned indicated in the column 602 may be stored in advance by the system, or may be determined dynamically with reference to distribution of the high-frequency components of the printed material that is the inspection target. Further, a plurality of relationships between the frequency component information and the inspection resolution may be stored, and the relationship between the frequency component information and the inspection resolution to be applied may be suitably switched and used based on, for example, size information of the page that is the inspection target.

<Method for Storing Page Information and Inspection Resolution>

FIG. 7 illustrates an example of a method for storing a relationship between a page and the inspection resolution according to the present exemplary embodiment.

In FIG. 7, a column 701 indicates a page number. A column 702 indicates the inspection resolution assigned to each page indicated in the column 701. In an example in a row 703, the inspection resolution of 150 dpi is assigned to a page with the page number 1. In a conventional example, the same inspection resolution is set for all pages, and thus, for example, in a case where there is a page in the printed material to which the inspection resolution of 300 dpi is to be assigned as indicated in a row 704, all of the pages are processed at the inspection resolution of 300 dpi. On the other hand, in the present exemplary embodiment, a different inspection resolution can be set for each page based on the inspection accuracy required for each page.

<Inspection Processing>

Figure 8:
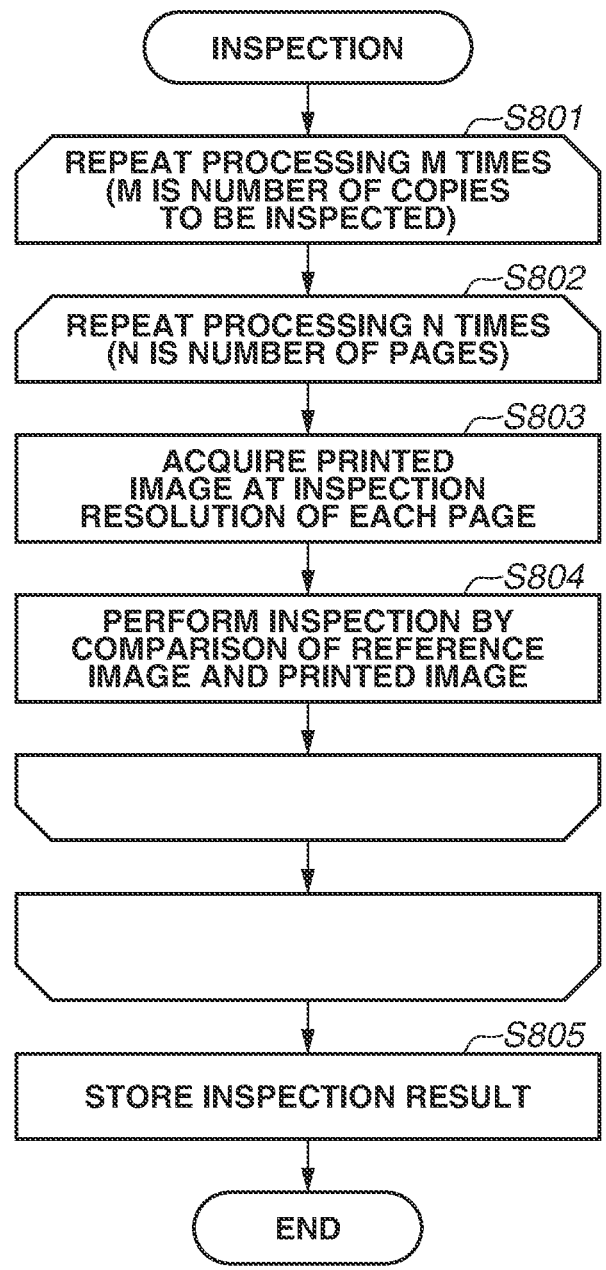
FIG. 8 is a flowchart illustrating inspection processing according to the first exemplary embodiment.

FIG. 8 is a flowchart illustrating the inspection processing according to the first exemplary embodiment and corresponding to the processing in step S302 in FIG. 3.

In step S801, the processing in subsequent steps S802 to S804 is repeated M times where M is the number of copies to be inspected. For example, in a case where the number of copies of the printed material is ten and all of the copies are the inspection target, the number of repetitions M is ten.

In step S802, the processing in subsequent steps S803 and S804 is repeated N times where N is the number of reference images existing in the reference image storage unit 201. The number of repetitions N corresponds to the number of pages of the printed material as the inspection target.

In step S803, the printed image storage unit 206 stores the printed image that is the inspection target.

The resolution of the printed image stored in step S803 conforms to the inspection resolution for each page stored in the inspection resolution storage unit 204. For example, in a case where a printed image corresponding to the page 1 in FIG. 7 is stored, image data is generated so that the resolution is 150 dpi and is stored in the printed image storage unit 206 as the printed image. As a method for storing image data with a predetermined resolution as a printed image, the inspection resolution is set for each page in the image reading device 105, and image data is generated and stored. In addition, the resolution conforming to the inspection resolution for each page stored in the inspection resolution storage unit 204 may be converted at the time of storing the image data acquired by the image reading device 105 in the printed image storage unit 206.

In step S804, the image inspection unit 207 performs the inspection. Here, the image data serving as the reference for inspection is the reference image of the corresponding page stored in the reference image storage unit 201 in step S405, and the image data that is the inspection target is the printed image of the corresponding page stored in the printed image storage unit 206 in step S803. Since both the reference image and the printed image are image data generated in conformity with information about the inspection resolution for each page stored in the inspection resolution storage unit 204, the reference image and the printed image are image data generated at the same resolution, and thus can be compared with each other and inspected. For example, in the inspection of the page 1 in FIG. 7, both the reference image stored in the reference image storage unit 201 and the printed image stored in the printed image storage unit 206 have the resolution of 150 dpi, and thus the images can be compared with each other and inspected.

In step S805, the inspection result storage unit 208 stores the inspection result. The inspection result stored in the inspection result storage unit 208 may be used to operate the conveyance path 110 for the printed material to switch between the output trays 111 and 112 for the printed material or may be displayed by the UI panel 108. In any case, usage of the inspection result is not limited in the present exemplary embodiment.

As described above, in the present exemplary embodiment, a different inspection resolution can be set for each page by use of the frequency component information for each page, and thus, it is possible to reduce the inspection time while the inspection is performed with the required inspection accuracy.

More specifically, in the conventional example, the same inspection resolution is set for all pages, and thus in a case where there is a page in a printed material to which the inspection resolution of 300 dpi is to be assigned, all of the pages are inspected at the inspection resolution of 300 dpi. On the other hand, in the present exemplary embodiment, a different inspection resolution (300 dpi, 200 dpi, or 150 dpi) is assigned to each page based on the inspection accuracy required for each page, and thus it is possible to reduce the inspection time while the inspection is performed with the required inspection accuracy.

In a second exemplary embodiment, an inspection resolution for each page is determined by use of feature amount information for each page. Accordingly, an inspection time is reduced while inspection is performed with a required inspection accuracy.

Each exemplary embodiment is described below mainly on a difference from the first exemplary embodiment. However, the technical scope of the present disclosure is not limited to these exemplary embodiments.

<Processing for Determining Inspection Resolution>

Figure 9:
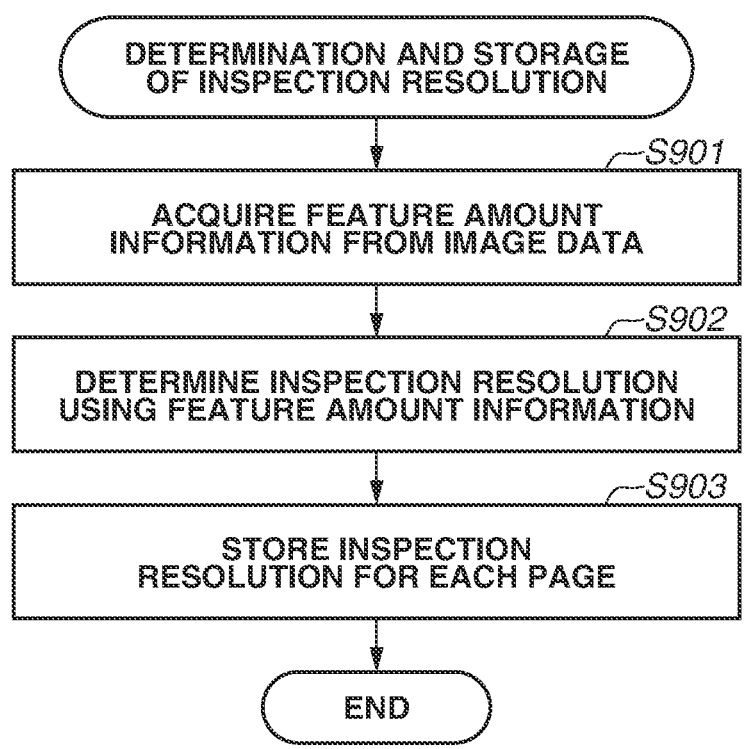
FIG. 9 is a flowchart illustrating processing for determining an inspection resolution according to a second exemplary embodiment.

FIG. 9 is a flowchart illustrating processing for determining and storing the inspection resolution according to the second exemplary embodiment and corresponding to the processing in step S404 in FIG. 4.

In step S901, the image analysis unit 202 acquires feature amount information from the reference image. The feature amount information corresponds to, for example, information about the number of corners detected by application of the Harris corner detection algorithm to the reference image.

In step S902, the inspection resolution determination unit 203 determines the inspection resolution for each page using the feature amount information acquired in step S901. As a specific example, the inspection resolution determination unit 203 determines whether the number of feature points in the corresponding page is large or small from the feature amount information and assigns the inspection resolution.

In step S903, the inspection resolution storage unit 204 stores the inspection resolution for each page determined in step S902.

<Method for Storing Feature Amount and Inspection Resolution>

FIG. 10 illustrates an example of a method for storing a relationship between a feature amount and the inspection resolution according to the second exemplary embodiment of the present disclosure.

In FIG. 10, a threshold value for the number of feature points is set in a column 1001. A column 1002 indicates the inspection resolution assigned to each number of feature points indicated in the column 1001. The inspection resolution described in the column 1002 is set to a resolution equal to or lower than 600 dpi, which is the resolution of the reference image stored in the reference image storage unit 201 in step S401. In an example in a row 1003, the inspection resolution of 300 dpi is assigned to the reference image whose number of feature points is determined to be "20 or more".

In the example in FIG. 10, a relatively high inspection resolution is assigned to the reference image determined as including a large number of feature points, and a relatively low inspection resolution is assigned to the reference image determined as including a small number of feature points. However, the relatively high inspection resolution may be assigned to the reference image determined as including the small number of feature points, and the relatively low inspection resolution may be assigned to the reference image determined as including the large number of feature points. For example, in a case where a printed material that includes a pattern including a character and a bar code is the inspection target, the relatively high inspection resolution is assigned to the reference image determined as including the large number of feature points, and thus it is possible to improve the inspection accuracy of a page including a character and a bar code.

On the other hand, in a case where a printed material that includes many natural images is the inspection target, the relatively high inspection resolution is assigned to the reference image determined as including the small number of feature points, and thus it is possible to improve the inspection accuracy of a page printed with a low-frequency image in which a defect is generally more noticeable.

The threshold value for the number of feature points indicated in the column 1001 and the inspection resolution indicated in the column 1002 may be stored in advance by the system, or may be determined dynamically with reference to distribution of the number of feature points of the printed material that is the inspection target. Further, a plurality of relationships between the feature amount and the inspection resolution may be stored, and the relationship between the feature amount and the inspection resolution to be applied may be suitably switched and used based on, for example, size information of the page that is the inspection target.

As described above, in the present exemplary embodiment, a different inspection resolution can be set for each page by use of the feature amount information for each page, and thus, it is possible to reduce the inspection time while the inspection is performed with the required inspection accuracy.

In a third exemplary embodiment, an inspection resolution for each page is determined by use of edge area information for each page. Accordingly, an inspection time is reduced while inspection is performed with a required inspection accuracy.

<Processing for Determining Inspection Resolution>

Figure 11:
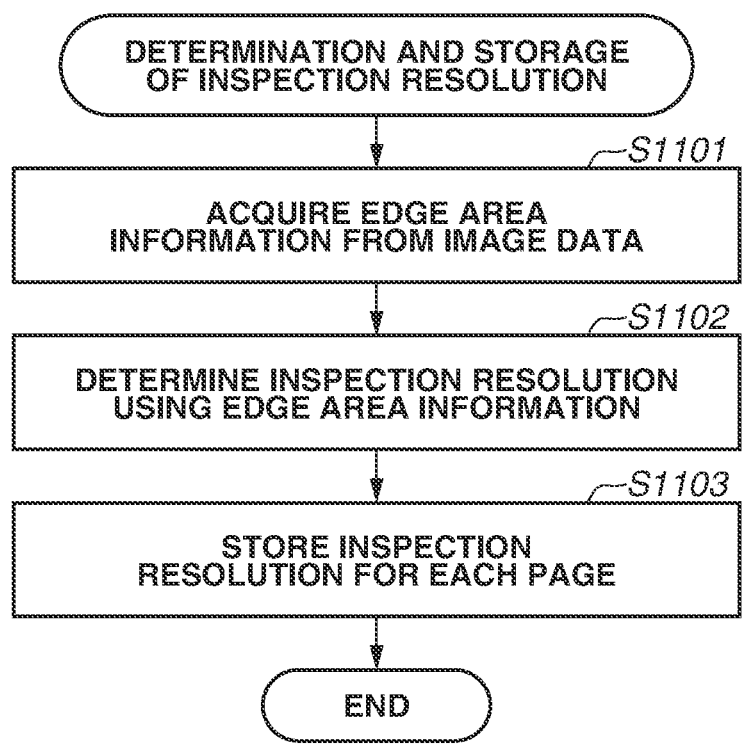
FIG. 11 is a flowchart illustrating processing for determining an inspection resolution according to a third exemplary embodiment.

FIG. 11 is a flowchart illustrating processing for determining and storing the inspection resolution according to the third exemplary embodiment and corresponding to the processing in step S404 in FIG. 4.

In step S1101, the image analysis unit 202 acquires edge area information from the reference image.

The edge area information corresponds to, for example, information obtained by extraction of an edge area from the reference image and calculation of a percentage of the extracted edge area in an entire paper surface of the corresponding page.

In step S1102, the inspection resolution determination unit 203 determines the inspection resolution for each page using the edge area information acquired in step S1101. As a specific example, the inspection resolution determination unit 203 determines whether an occupancy percentage of the edge area on the corresponding page is large or small from the edge area information and assigns the inspection resolution.

In step S1103, the inspection resolution storage unit 204 stores the inspection resolution for each page determined in step S1102.

<Method for Storing Edge Area Information and Inspection Resolution>

FIG. 12 illustrates an example of a method for storing a relationship between a percentage of the edge area and the inspection resolution according to the third exemplary embodiment of the present disclosure.

In FIG. 12, a threshold value for the percentage of the edge area is set in a column 1201. A column 1202 indicates the inspection resolution assigned to each percentage of the edge area indicated in the column 1201. The inspection resolution described in the column 1202 is set to a resolution equal to or lower than 600 dpi, which is the resolution of the reference image stored in the reference image storage unit 201 in step S401. In an example in a row 1203, the inspection resolution of 300 dpi is assigned to the reference image whose percentage of the edge area is determined to be "40 or more".

In the example in FIG. 12, a relatively high inspection resolution is assigned to the reference image determined as including a large percentage of edge area, and a relatively low inspection resolution is assigned to the reference image determined as including a small percentage of edge area. However, the relatively high inspection resolution may be assigned to the reference image determined as including a small percentage of edge area, and the relatively low inspection resolution may be assigned to the reference image determined as including the large percentage of edge area. For example, in a case where a printed material that includes a pattern including a character and a bar code is the inspection target, the relatively high inspection resolution is assigned to the reference image determined as including the large percentage of edge area, and thus it is possible to improve the inspection accuracy of a page including a character and a bar code.

On the other hand, in a case where a printed material that includes many natural images is the inspection target, the relatively high inspection resolution is assigned to the reference image determined as including the small percentage of edge areas, and thus it is possible to improve the inspection accuracy of a page printed with a low-frequency image in which a defect is generally more noticeable.

The threshold value for the percentage of edge area indicated in the column 1201 and the inspection resolution indicated in the column 1202 may be stored in advance by the system, or may be determined dynamically with reference to distribution of the feature amounts of the image that is the inspection target. Further, a plurality of relationships between the edge area information and the inspection resolution may be stored, and the relationship between the edge area information and the inspection resolution to be applied may be suitably switched and used based on, for example, size information of the page as the inspection target.

As described above, in to the present exemplary embodiment, a different inspection resolution can be set for each page by use of the edge area information for each page, and thus, it is possible to reduce the inspection time while the inspection is performed with the required inspection accuracy.

In a fourth exemplary embodiment, an inspection resolution for each page is determined depending on whether printing is performed on each page. Accordingly, an inspection time is reduced while inspection is performed with a required inspection accuracy.

<Processing for Determining Inspection Resolution>

FIG. 13 is a flowchart illustrating processing for determining and storing the inspection resolution according to the fourth exemplary embodiment and corresponding to the processing in step S404 in FIG. 4.

In step S1301, the image analysis unit 202 determines whether a page corresponds to a print side or a blank side. In a case where it is determined that the page corresponds to the blank side (YES in step S1301), the processing proceeds to step S1302, whereas in a case where it is determined that the page does not correspond to the blank side, i.e., the page corresponds to the print side (NO in step S1301), the processing proceeds to step S1303. In the determination, for example, histogram information of the reference image is analyzed, and in a case where there is no pixel with a specific pixel value or more, the page is determined as corresponding to the blank side.

As another example, page description language (PDL) information and raster image processor (RIP) information of the page may be acquired from the printing server 180 or the printing apparatus 190 and analyzed to determine whether the page corresponds to the print side or the blank side.

In step S1302, the inspection resolution determination unit 203 determines the inspection resolution to be 150 dpi. The processing in step S1302 is executed in a case where it is determined that the page corresponds to the blank side in step S1301. In the present exemplary embodiment, the inspection resolution of 150 dpi is assigned on the assumption that the inspection accuracy required for the blank side is low.

In step S1303, the inspection resolution determination unit 203 determines the inspection resolution to be 300 dpi. The processing in step S1303 is executed in a case where it is determined that the page corresponds to the print side in step S1301. In the present exemplary embodiment, the inspection resolution of 300 dpi is assigned on the assumption that the inspection accuracy required for the print side is high.

In step S1304, the inspection resolution storage unit 204 stores the inspection resolution for each page determined in step S1302 or S1303.

As described above, in the present exemplary embodiment, a different inspection resolution can be set for each page based on whether printing is performed on each page, and thus, it is possible to reduce the inspection time while the inspection is performed with the required inspection accuracy.

A resolution for each page may be set by use of a setting received from a user for at least one page using the printing apparatus I/F 106 or the UI panel 108. In that case, there is no need to analyze each page.

In embodiments of the present disclosure, a different inspection resolution can be set for each page, and thus it is possible to reduce an inspection time while inspection is performed with a required inspection accuracy.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-073897, filed Apr. 27, 2022, which is hereby incorporated by reference herein in its entirety.

What is claimed is:

1. An image processing apparatus comprising:
   one or more processors; and
   at least one memory storing executable instructions, which when executed by the one or more processors, cause the image processing apparatus to perform operations comprising:
   acquiring information about a reference image from reference image data corresponding to a page;

setting an inspection resolution for inspecting a printed image for the page based on the information about the reference image acquired from the reference image data corresponding to the page; and inspecting the printed image by comparing the reference image data serving as a reference for inspection with printed image data acquired by reading the printed image based on the set inspection resolution.

2. The image processing apparatus according to claim 1, wherein the page is one page among a plurality of pages,
wherein the setting includes setting a respective inspection resolution for inspecting a respective printed image for each page of the plurality of pages, and
wherein the inspection resolution of at least the one page is different from the respective inspection resolution of pages other than the at least the one page among the plurality of pages.

3. The image processing apparatus according to claim 2,
wherein the inspection resolution of the at least the one page is higher than the respective inspection resolution of the other pages, and
wherein the other pages are pages including fewer high-frequency components than the at least the one page.

4. The image processing apparatus according to claim 3, wherein the high-frequency component is an edge area in the printed image.

5. The image processing apparatus according to claim 2,
wherein the inspection resolution of the at least the one page is higher than the respective inspection resolution of the other pages, and
wherein the other pages are pages including more high-frequency components than the at least the one page.

6. The image processing apparatus according to claim 2,
wherein the inspection resolution of the at least the one page is higher than the respective inspection resolution of the other pages, and
wherein the other pages are pages including fewer feature points than the at least the one page.

7. The image processing apparatus according to claim 2,
wherein the inspection resolution of the at least the one page is higher than the respective inspection resolution of the other pages, and
wherein the other pages are pages including more feature points than the at least the one page.

8. The image processing apparatus according to claim 1, wherein the setting the inspection resolution includes setting an inspection resolution of a blank side to be lower than an inspection resolution of a print side of the printed image.

9. A method for processing an image, the method comprising:
acquiring information about a reference image from reference image data corresponding to a page;
setting an inspection resolution for inspecting a printed image for the page based on the information about the reference image acquired from the reference image data corresponding to the page; and
inspecting the printed image by comparing the reference image data serving as a reference for inspection with printed image data acquired by reading the printed image based on the set inspection resolution.

10. A non-transitory computer-readable storage medium storing instructions that, when executed by a computer, cause the computer to perform a method for processing an image, the method comprising:
acquiring information about a reference image from reference image data corresponding to a page;
setting an inspection resolution for inspecting a printed image for the page based on the information about the reference image acquired from the reference image data corresponding to the page; and
inspecting the printed image by comparing the reference image data serving as a reference for inspection with printed image data acquired by reading the printed image based on the set inspection resolution.

* * * * *